United States Patent
Flegal et al.

(10) Patent No.: US 7,134,730 B2
(45) Date of Patent: Nov. 14, 2006

(54) SEAT TRIM COVER ASSEMBLY AID

(75) Inventors: Thomas Brian Flegal, Northville, MI (US); Daniel Joseph Jarackas, Jr., Ruby, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 130 days.

(21) Appl. No.: 11/202,624

(22) Filed: Aug. 13, 2005

(65) Prior Publication Data
US 2006/0061192 A1    Mar. 23, 2006

Related U.S. Application Data

(62) Division of application No. 10/858,904, filed on Jun. 2, 2004, now Pat. No. 6,964,453.

(51) Int. Cl.
*B68G 7/00* (2006.01)
(52) U.S. Cl. .............. 297/452.6; 297/452.62; 29/91.1; 29/91.6; 29/418
(58) Field of Classification Search ............. 297/452.6, 297/452.61, 452.62; 29/91.1, 91.6, 418
See application file for complete search history.

(56) References Cited

U.S. PATENT DOCUMENTS

| | | | |
|---|---|---|---|
| 4,765,045 A | 8/1988 | Selbert et al. | |
| 4,885,828 A | 12/1989 | Kozlowski | |
| 5,175,916 A | 1/1993 | Klems | |
| 5,231,745 A | 8/1993 | Phelan et al. | |
| 5,362,535 A | 11/1994 | Sasaki et al. | |
| 5,635,264 A | 6/1997 | Pike et al. | |
| 5,669,129 A | 9/1997 | Smith et al. | |
| 5,820,213 A | 10/1998 | Severinski | |
| 5,820,214 A | 10/1998 | Bessette et al. | |
| 5,826,939 A | 10/1998 | Beyer | |
| 5,964,017 A * | 10/1999 | Roberts | 29/91.1 |
| 5,971,478 A | 10/1999 | Hurite | |
| 6,322,141 B1 | 11/2001 | Dutkievic et al. | |
| 6,508,963 B1 | 1/2003 | Jaillet et al. | |
| 6,561,581 B1 | 5/2003 | Michot et al. | |
| 6,899,399 B1 * | 5/2005 | Ali et al. | 297/452.6 |

* cited by examiner

*Primary Examiner*—Anthony D. Barfield
(74) *Attorney, Agent, or Firm*—Raggio & Dinnin, P.C.

(57) ABSTRACT

A method of manufacturing a seat that includes the steps of attaching adjacent upholstery panels with a locator strip and attachment strip sandwiched therebetween. The attachment strip includes an enlarged edge portion that engages clips in a molded foam seat backing. At least a portion of the locator strip is torn away along a line of perforations formed therein.

12 Claims, 2 Drawing Sheets

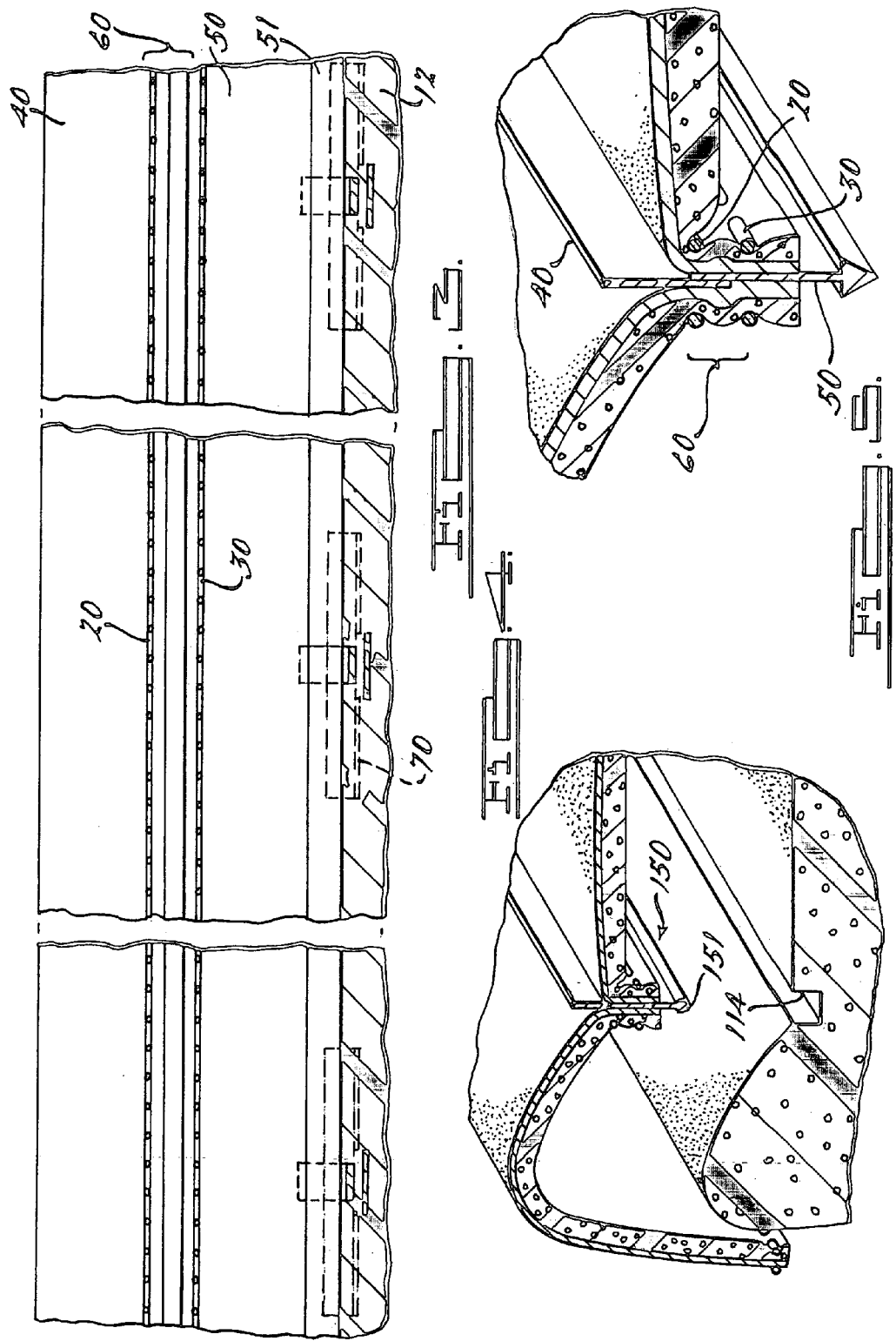

SEAT TRIM COVER ASSEMBLY AID

This is a Divisional of application Ser. No. 10/858,904, filed Jun. 2, 2004 now U.S. Pat. No. 6,964,453.

TECHNICAL FIELD

The present invention relates generally to processes and designs for attaching upholstery material to a seat backing, and relates more particularly to such a design and process wherein a locator strip and an attachment strip are secured to adjacent pieces of upholstery material and the attachment strip is engaged with clip retainers in the seat, allowing part of the locator strip to be torn away.

BACKGROUND OF THE INVENTION

Conventional vehicle seats generally include one or more backing members, and a plurality of upholstery panels positioned thereon. Various processes and designs have been developed over the years for attaching the upholstery material onto the backing. Automated methods are known whereby the upholstery material is positioned by a machine onto the pre-formed backing material, as well as methods wherein an operator attaches the upholstery material manually.

In one common manual technique, an operator positions the upholstery material and secures the same to the backing material by sliding a retaining member attached to adjacent pieces of upholstery material into a receiving groove in a foam cushion or backer. This process allows the upholstery to be attached to the backer relatively quickly and easily, however it is necessary to fold one of the adjacent upholstery panels double, i.e. backwardly against the opposing piece of upholstery material so that the operator can visually determine the appropriate orientation and positioning of the retaining member for receipt in the groove.

In another known design, a robotic machine is utilized to position upholstery material proximate a mold in which a formable foaming material is injected, which solidifies to create the backer for the seat. The solidification of the foam material adheres to a retaining member extending between the adjacent upholstery panels. In this design, the robotic device grasps a strip that is inserted and attached between the adjacent panels, which may be torn away along a perforated line after the molding process is complete.

SUMMARY OF THE INVENTION

The present invention provides a design and process for attaching upholstery material to a seat cushion or backing. The design preferably includes a locator strip and an attachment strip secured between adjacent upholstery panels attached with longitudinal stitching lines. The locator strip and attachment strip may be one integral piece, or they may be formed as separate pieces. A first stitching line preferably penetrates both pieces of cover material as well as the locator strip and attachment strip. A second stitching line is substantially parallel to the first stitching line and preferably pierces both of the cover panels and the locator strip, but does not pierce the attachment strip. The second stitching line is preferably positioned inboard of the attachment strip. During seat assembly, the locator strip can be manually grasped from an exterior side of the upholstery covering, and the material manipulated such that the attachment strip may be pushed into a complementary groove in the seat backer. One or more clips molded into or otherwise attached to the backer preferably snap-fit with the attachment strip. Once positioned appropriately, the locator strip may be torn away from the seat assembly along longitudinal perforations formed in the strip.

BRIEF DESCRIPTION OF THE DRAWINGS

FIG. 3 is a sectioned side view along line A—A of FIG. 2;

FIG. 4 is a sectioned end view partially in perspective of a second preferred embodiment of the present invention;

FIG. 5 is a partial enlarged view of the cover attachment assembly of FIG. 1.

DETAILED DESCRIPTION OF PREFERRED EMBODIMENTS

Figure 1:
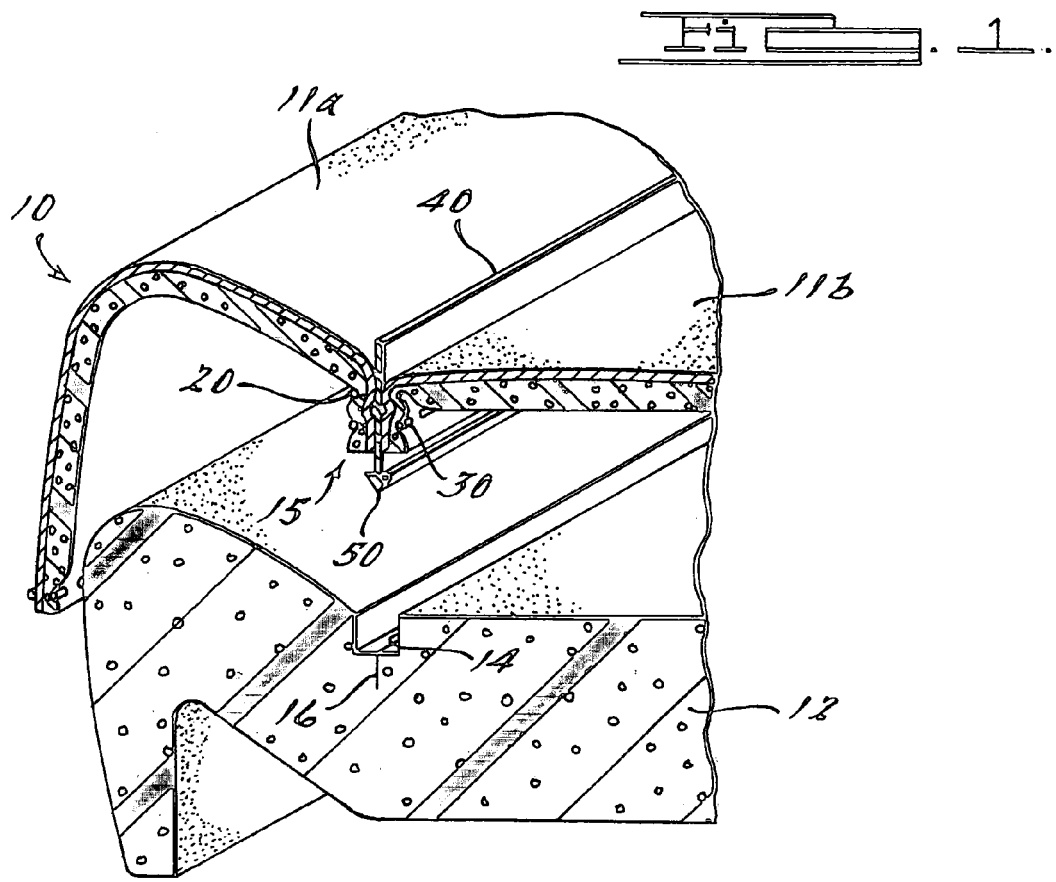
FIG. 1 is a sectioned end view, partially in perspective of a cover attachment assembly according to a preferred embodiment of the present invention.

Referring to FIG. 1, there is shown a seat cover assembly 10 according to the present invention, adapted for attaching to a seat backing 12. Seat cover assembly 10 includes first and second upholstery panels 11A and 11B. Upholstery panels 11A and 11B are joined at a seam 15 and preferably stitched together there along via first and second stitching lines 20 and 30. A locator strip 40 and attachment strip 50 are preferably sandwiched between upholstery panels 11A and 11B and extend substantially along a length of seam 15. Locator strip 40 and attachment strip 50 may be formed integrally, e.g. as a single plastic extrusion, or they may be formed as individual pieces. In a preferred embodiment, locator strip 40 and attachment strip 50 are positioned adjacently; however, attachment strip 50 might be positioned on the opposite side of one of upholstery panels 11A and 11B from locator strip 40. Locator strip 40 is preferably an elongate rectangular plastic piece having a substantially uniform thickness. In a preferred embodiment first stitching line 20 pierces both of upholstery panels 11A and 11B as well as locator strip 40 and attachment strip 50. While FIG. 1 illustrates locator strip 40 and attachment strip 50 substantially as a uniform piece, in alternative preferred embodiments locator strip 40 and attachment strip 50 include a region 60 that overlaps proximate first stitching line 20, as shown in FIG. 5. Thus, when seat cover assembly 10 is assembled, a portion of attachment strip 50 is positioned in an overlying relationship with a portion of locator strip 40, and first stitching line 20 is subsequently formed therethrough. Second stitching line 30 preferably pierces both of upholstery panels 11A and 11B as well as attachment strip 50, however, locator strip 40 preferably does not extend sufficiently far in an outboard direction between panels 11A and 11B such that it is pierced by second stitching line 30. As used herein, the term "outboard" should be understood to refer to a direction toward the edges of panels 11A and 11B that comprise seam 15, whereas "inboard" should be understood to refer to an opposite direction, i.e. away from seam 15.

Seat backing 12 is preferably a solid piece of pre-formed foam material well known in the art. The present invention is contemplated for use with pre-formed seat backings, as opposed to systems wherein a seat backing if formed during cover assembly, such as by foaming the backing material while the cover is positioned thereover. A groove 14 is formed in seat backing 12, preferably during the molding process. A longitudinal slit 16 may be formed in groove 14, as described below. In a preferred embodiment, an assembly worker can grasp locator strip 40 and manipulate seat cover assembly 10 such that the attached portions of upholstery panels 11A and 11B, along with attachment strip 50 can be inserted into groove 14. This step may be performed "blind," that is by grasping locator strip 40 from an exterior cover side of the upholstery panels 11A and 11B, and moving attachment strip 50 to an appropriate position, aligned with groove 14, then pushing attachment strip 50 into place. This step can be carried out without the need for flipping the upholstery panels such that they are doubled over to visually identify the appropriate place for attachment strip 50.

Figure 2:
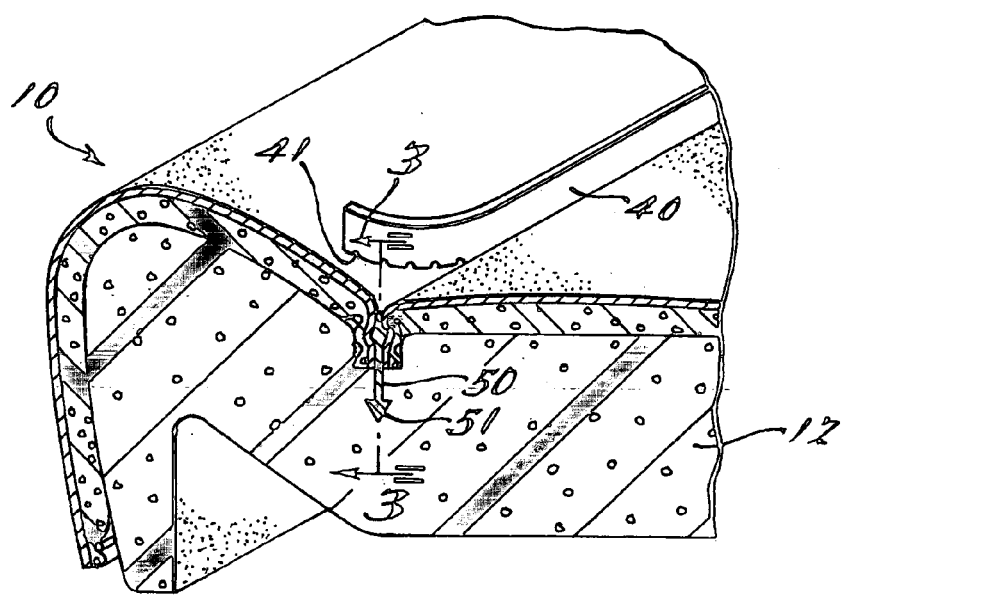
FIG. 2 is a sectioned end view, also partially in perspective of the cover assembly of FIG. 1, illustrating a locator strip in a partially torn position.

Turning to FIG. 2, there is shown seat cover assembly 10 engaged with seat backing 12. Upon engaging cover 10 and backing 12, locator strip 40 may be torn away from seam 15 along the perforations formed by first stitching line 20, rendering an aesthetically pleasing appearance to the covered seat. Embodiments are contemplated wherein the entire strip 40 is pulled free from seam 15, as well as embodiments wherein a portion of strip 40 remains. A plurality of perforations 41 are illustrated in FIG. 2 and represent points at which locator strip 40 is longitudinally pierced by the stitches that form first stitching line 20. It should be appreciated, however, that perforations 41 need not be formed by the stitches, but could instead be formed by some other means. Attachment strip 50 preferably includes an arrow-shaped, barbed or otherwise enlarged longitudinal edge portion 51 for engagement with complementary clips in backing 12, described below. Various adhesives, epoxies, etc. may be utilized to enhance the retention of attachment strip 50 and the edges of upholstery panels 11A and 11B in groove 14.

Turning now to FIG. 3, there is shown a sectioned view of the various components of seat cover assembly 10 taken along line A—A of FIG. 2, prior to tearing locator strip 40 away from assembly 10. As illustrated in FIG. 3, first and second stitching lines 20 and 30 extend substantially in parallel proximate an interface of locator strip 40 and attachment strip 50. The interface of locator strip 40 and attachment strip 50 comprises an overlapping region 60, also shown in FIG. 5. First stitching line 20 is preferably formed such that it pierces both of locator strip 40 and attachment strip 50, whereas second stitching line 30 preferably pierces only attachment strip 50.

Further illustrated in FIG. 3 are retention members or clips 70. In a preferred embodiment, clips 70 snap fit with enlarged edge portion 51 of attachment strip 50, and assist in retaining attachment strip 50 in the target groove. Clips 70 are preferably attached to backing member 12, within groove 14, and the seat cover assembly lowered into engagement with backing member 12, snap fitting attachment strip 50 into engagement with clips 70. Various designs are contemplated wherein clips 70 are positioned at varying locations along the groove in the seat backing, allowing the cover assembly 10 to be secured at selected points. For example, portions of vehicle seats exposed to relatively greater mechanical stress and strain may call for a relatively securely attached cover assembly at that point, requiring one or more clips. Other regions may require or be better suited to a degree of play between the covering and the backer and may thus require fewer or no clips 70.

Turning now to FIG. 4, there is shown an alternative embodiment of the present invention including an attachment strip 150 having an alternatively shaped head 151. Many variations might be made to the design and structure of attachment strip 50, 150. It is generally preferred, however, to provide a strip having a shape that facilitates mating engagement with fasteners or clip members 70.

By providing a design having a plurality of fasteners 70, preferably slidable relative to enlarged portion 51, 151, seat cover assembly 10 can be securely attached to seat backing member 12 at a plurality of selectable positions along a length of strip 50, 150. Moreover, a sliding interface between clips 70 and attachment strip 50 provides for some "play" between the clips 70 and secured cover assembly 10, reducing wear on the seat in some instances, and compensating for slight variations from the prescribed fastening of the seat cover 10 to the seat backing 12 during manufacturing. Thus, where attachment strip 50, 150 is not perfectly positioned relative to a particular supporting clip 70, the relative position of the cover assembly 10 with respect to the seat backing 14 can be adjusted slightly without disengaging the cover assembly 10 therefrom.

Further advantages of the present design include the capacity for "two-way" assembly of seat covers with seat backing members. For example, because an operator can grasp locator strip 40, entry of the edges of upholstery panels 11A and 11B into groove 14, along with attachment strip 50, can be made from either of opposite sides of groove 14. Variations in the design of interior upholstered members in vehicles makes it desirable in some instances to be able to attach the upholstery cover from different angles or sides of the groove 14.

The present description is for illustrative purposes only, and should not be construed to narrow the breadth of the present invention in any way. Thus, those skilled in the art will appreciate that various modifications might be made to the presently disclosed embodiments without departing from the spirit and scope of the invention. Other aspects, features, and advantages will be apparent upon an examination of the attached drawing Figures and appended claims.

What is claimed is:

1. A method of manufacturing an upholstered seat comprising the steps of:
    positioning edge portions of first and second upholstery panels in adjacent substantially parallel planes with aligned longitudinal edges;
    positioning a locator strip between adjacent portions of the panels proximate the longitudinal edges;
    positioning an attachment strip proximate and aligned with the locator strip, the attachment strip including an enlarged longitudinal portion positioned outboard of the locator strip;
    stitching the first and second upholstery panels together along a stitching line;
    positioning a plurality of clip members along a groove in a molded foam seat backing, wherein the clip members are substantially complementary to the enlarged longitudinal portion of the attachment strip and adapted to snap-fit with the same;
    engaging the enlarged longitudinal portion of the attachment strip with the clip members, thereby securing the upholstery panels to the seat backing;
    removing a portion of the locator strip by tearing it along longitudinal perforations formed therein.

2. The method of claim 1 wherein the locator strip and attachment strip are an integral extruded plastic piece.

3. The method of claim 1 wherein the locator strip and attachment strip are separate pieces.

4. The method of claim 3 wherein the step of positioning the attachment strip proximate the locator strip comprises positioning the attachment strip adjacent thereto.

5. The method of claim 3 wherein the step of positioning the attachment strip proximate the locator strip comprises positioning the attachment strip such that it is separated from the locator strip by one of said first and second upholstery panels.

6. The method of claim 1 wherein the enlarged portion comprises an arrow shaped cross section.

7. The method of claim 1 wherein the enlarged portion is a substantially cylindrical bead.

8. The method of claim 1 wherein the clip members slidably receive the enlarged portion of the attachment strip.

9. The method of claim 1 wherein the step of engaging the enlarged longitudinal portion of the attachment strip with the clip members comprises manipulating the position of the attachment strip from an exterior side of the upholstery panels.

10. The method of claim 9 wherein the step of engaging the enlarged longitudinal portion of the attachment strip with the clip members comprises:

grasping the locator strip and urging the attachment strip into engagement with the clip members by pushing the locator strip toward the groove, a force thereon snap-fitting the enlarged longitudinal portion with the clip members.

11. A method of manufacturing a seat comprising the steps of:

positioning an elongate extruded strip with an enlarged edge in a stitched seam between adjacent upholstery panels such that the enlarged edge is positioned outboard of the seam and substantially parallel thereto;

positioning portions of the upholstery panels proximate the seam in a groove in a preformed molded seat backing, thereby engaging the enlarged edge with at least one substantially complementary clip retainer in the seat backing;

tearing a portion of the strip away from the seam along perforations formed therein, leaving the enlarged edge in engagement with the clip retainers and thereby securing the upholstery panels to the seat backing.

12. The method of claim 11 wherein the step of attaching the adjacent upholstery panels comprises forming parallel first and second stitching lines proximate edges of the panels and substantially parallel thereto.

\* \* \* \* \*

UNITED STATES PATENT AND TRADEMARK OFFICE
CERTIFICATE OF CORRECTION

| | | |
|---|---|---|
| PATENT NO. | : 7,134,730 B2 | Page 1 of 1 |
| APPLICATION NO. | : 11/202624 | |
| DATED | : November 14, 2006 | |
| INVENTOR(S) | : Thomas Brian Flegal et al. | |

It is certified that error appears in the above-identified patent and that said Letters Patent is hereby corrected as shown below:

Col. 2, Line 65 - Please delete "if" and insert -- is -- after "wherein a seat backing"

Signed and Sealed this

Sixth Day of February, 2007

JON W. DUDAS
*Director of the United States Patent and Trademark Office*